US007890306B2

(12) United States Patent
Alderman et al.

(10) Patent No.: US 7,890,306 B2
(45) Date of Patent: Feb. 15, 2011

(54) OPTIMAL METHODOLOGY FOR ALLOCATION AND FLOWDOWN

(75) Inventors: Jerry L. Alderman, Tucson, AZ (US); George Runger, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 828 days.

(21) Appl. No.: 11/530,491

(22) Filed: Sep. 11, 2006

(65) Prior Publication Data

US 2008/0065357 A1 Mar. 13, 2008

(51) Int. Cl.
*G06F 17/10* (2006.01)
(52) U.S. Cl. .............................. 703/2; 702/19; 702/20; 702/27; 700/31; 716/2
(58) Field of Classification Search ................... 700/31, 700/108; 703/11
See application file for complete search history.

(56) References Cited

U.S. PATENT DOCUMENTS

| | | | | |
|---|---|---|---|---|
| 6,249,712 | B1 * | 6/2001 | Boiquaye | 700/31 |
| 6,732,350 | B1 | 5/2004 | Falk | |
| 7,243,320 | B2 | 7/2007 | Chiu et al. | |
| 2005/0004833 | A1 | 1/2005 | McRae et al. | |
| 2005/0149917 | A1 | 7/2005 | Brown | |
| 2007/0038413 | A1 | 2/2007 | Mehta et al. | |
| 2007/0260346 | A1 * | 11/2007 | Ganesan et al. | 700/108 |

OTHER PUBLICATIONS

Satish D. Kini An Approach to Integrating Numerical and Response Surface Models for Robust Design of Production Systems, Dissertation The Ohio State University 2004.*
Kathryn Chaloner, Isabella Verdinelli Bayesian Experimental Design: A Review Statistical Science 1995, vol. 10, No. 3, pp. 273-304.*
M. S. Packianather, P. R. Drake, H. Rowlands Optimizing the Parameters of Multilayerd Feedforward Neural Networks through Taguchi Design of Experiments Quality and Reliability Engineering International, Qual. Reliab.Engng. Int. 2000, 16: pp. 461-473.*
S. P. Asprey, S. Macchietto Designing robust optimal dynamic experiments Journal of Process control 12, 2002, pp. 545-556.*
Kathryn Chaloner, Isabella Verdineli Bayesian Experimental Design: A Review 1995.*
U.S. Appl. No. 11/688,327, filed Mar. 2007, Alderman.

* cited by examiner

*Primary Examiner*—Kamini S Shah
*Assistant Examiner*—Cuong V Luu
(74) *Attorney, Agent, or Firm*—Renner, Otto, Boisselle & Sklar, LLP

(57) ABSTRACT

A system and method of implementing a top-down flow down of at least one system requirement to allocate variability to system components such that overall system response meets the at least one system requirement, includes specifying a target value for the system response, and using a non-linear model to relate response variable values to targeted variable values and targeted mean values of the response variable values.

29 Claims, 5 Drawing Sheets

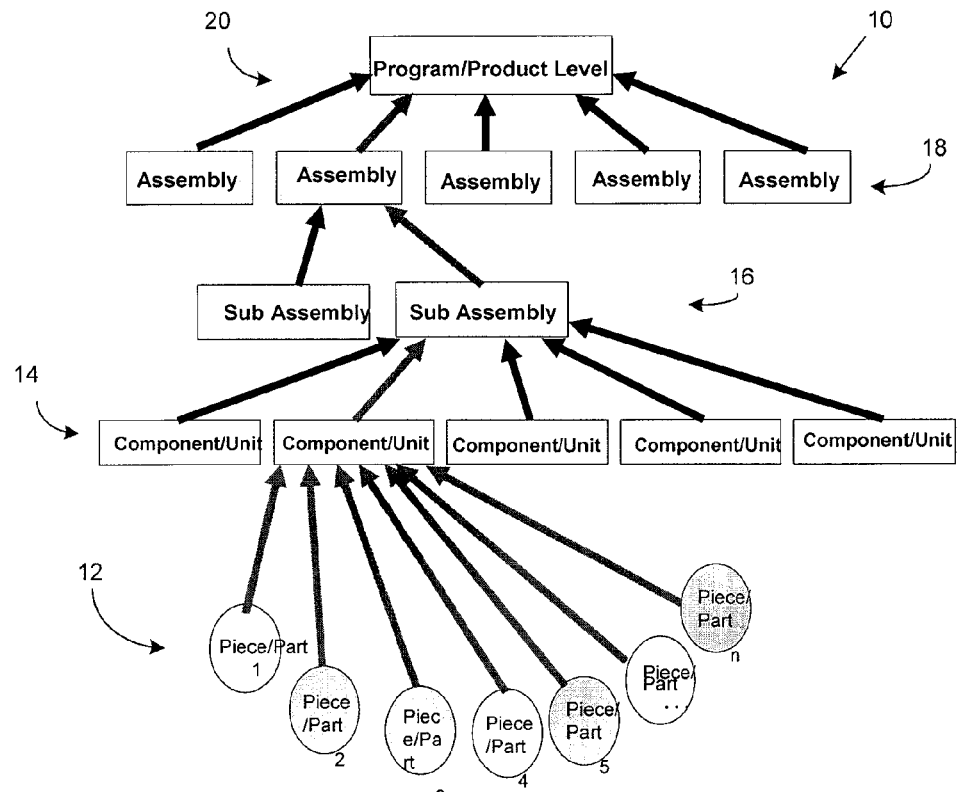
Fig. 1 (Conventional)

For the Special Case of m=1 The Product of All Component Variances is Maximized (this corresponds to a DOptimal Solution in the Design of Experiments.

All other values of m produce an extremum of the sum shown on the chart with the indicated value of p

Fig. 6

| | A | B | C | D | E | F | G | H | I | J | K | L | M |
|---|---|---|---|---|---|---|---|---|---|---|---|---|---|
| | PROGRAM: | | LCAC Fan Sensitivity to Pressure and Temp Variations | | | | | | ASSEMBLY INFORMATION | | | Show Spec Limits: |
| | ANALYSIS DESCRIPTION: | | | | | | | m Value for Allocation | | PART #: NAME: | | | ○ % of Mean |
| | ANALYST: | | | | DATE: 12-Sep-05 | | | 0.5000 | | | | | ● Actual Values |
| | Variable Name | Mean Value | Calc Sens | Assigned +/- TOL | TOL % or Value? | Uniform Dist? (Y or N) | Keep Allocated Value? | Allocated Standard Deviations | Tolerance In σ's | Lower Specification Limit | Upper Specification Limit | Percent of Total Variance | Factor 2nd Derivatives |
| | A-Press | 1.0019 | -6117.946994 | 0.0159 | V | N | ☑ | 0.0053 | 3.0000 | 0.986047 | 1.017763 | 5.6192% | 16626.5370 |
| | B-Temp | 22.0900 | 2150.704226 | 18.4612 | V | N | ☑ | 6.1504 | 3.0000 | 3.5488 | 40.5112 | 94.3808% | 0.0603 |
| | C-Fan Effic | 0.8500 | 4378.042798 | | | N | ☐ | | 3.0000 | | | | 0.0000 |
| | D-Fan Dia | 59.0000 | -177.8306991 | | | N | ☐ | | 3.0000 | | | | 15.0765 |
| | E-Fan Ratio | 1.7000 | 1764.55235 | | | N | ☐ | | 3.0000 | | | | -3113.9159 |
| | F-Mass Flow | 324.0000 | 27.68243524 | | | N | ☐ | | 3.0000 | | | | 0.1500 |

| Response = | 3721.3363 | | | Response Mean | 3722.712479 | | | |
|---|---|---|---|---|---|---|---|---|
| Lower Spec Limit (LSL) = | 3250.0000 | | | Actual Value = | 3.648080074 | 0.000264275 | 1.3639E-02 | |
| | 4500.0000 | | | Target Value = | | PNC | Std. Dev. | |
| | | | | SIGMA Value | | | | Toggle GRAPHIC |

OPTIMAL METHODOLOGY FOR ALLOCATION AND FLOWDOWN

FIELD OF THE INVENTION

The present invention relates to statistical design methods and, more particularly, to a system and method for top down allocation of variability to components of a complex composite system.

BACKGROUND OF THE INVENTION

System design and development is known in the art. A customer will typically contract with a designer/manufacturer to design and develop a system. The customer typically provides top-level system requirements (i.e., required specifications) within the contract. However, these requirements describe the performance of the entire system, and systems are designed and developed as individual elements (e.g., components, sub-assemblies, circuit cards, software packages, etc.). Hence, requirements development is the process of defining the requirements of each of the individual system elements such that they all work together to form an optimum system level solution.

Complex systems require many different system elements to be developed at the same time and still be functional as large systems once integrated together. Hence, providing components at the lower end of the system tree (e.g., the individual components) that enable the required specifications to be satisfied (e.g., the overall system) is crucial to the design and manufacture of the system.

Traditionally, development programs have used a "bottom up" approach to assessing the effect that lower level allocations may have on a system. As is illustrated in FIG. 1, such traditional approach starts with a bottom level and, through trial and error, the impact that assumed allocations would have at higher levels is assessed, and the allocations are adjusted until the desired results are obtained.

As an example, FIG. 1 illustrates a typical specification tree 10, in this case relating to the development of a product, such as a weapons system, for example. The top-level requirements typically come from the customer contract. Next, specifications are developed for each major sub-program (e.g., the individual parts 12, the components 14 that include the parts 12, the sub assemblies 16 that include the components 14, the assemblies 18 that includes the sub-assemblies 16, and the product 20 that includes the assemblies 18). Next, assignments are made to component standard deviations based on expert judgment. These allocations then are run through a simulation or model and used to predict the probability of compliance of the system response with the required specifications. When this comparison fails, as it usually does, the user alters one or more component standard deviations and iterates until a solution is found. There is no guarantee that this process will ever find a solution, but in the hands of an expert, it will usually find an approximate solution. There is no way to know, however, whether one is near an optimal, best or cost effective solution.

With the above-described conventional approach, the emphasis is on determining a standard deviation for a lower level, and then iteratively evaluating how that standard deviation impacts the overall system. This leads to one drawback wherein the approach is slow in determining the requirements for each component and, thus, the system. Another drawback is that one cannot be certain that an optimal solution has been obtained.

Yet another drawback is that complex requirements are usually analyzed multiple times during flow-up from one level to the next. For example, a first set of analyses is done to determine the allocation of requirements at the component level 12 of the specification tree 10, then again to determine the allocation between the elements at the next level, and so on. Each time the analysis is repeated in increasing level of detail, in order to refine the requirements as they flow up through the system. However, repeating the analysis many times can be inefficient.

SUMMARY OF THE INVENTION

A system and method in accordance present invention enables the allocation of standard deviations to system components such that overall system response meets specified levels of system performance. System performance can be stated as a requirement to meet a designated SIGMA score, a designated probability of non-compliance (PNC) or a designated standard deviation for the system response. Using the system, an individual may enter one or more system requirements and optimization preferences, and the invention provides a standard deviation to each design variable such that all design requirements are met, as well as the optimization preferences. In other words, the solution can be optimal in the sense that some function of component standard deviations take on an extreme value.

Unlike prior approaches to allocation, the system and method described herein implement a top down flow down of requirements. Given an overall system requirement and a proposed design, this approach allocates variability to all the components of the design and does so in a manner that assures that the system design criteria are met. In addition, allocations generated with this approach have certain optimal properties, and users can select which optimal features they wish to employ. Generally, these can be understood as different ways of making maximal use of the multi-dimensional design space while still meeting system requirements.

The allocation process also may extend the representation of system response variability to include higher order terms than prior quantitative approaches, and also may reference higher order statistical moments of the input variables (e.g., up to the fourth). For example, the allocation process can be based on a second order model of system response, and can include user selectable algorithms that, instead of allocating standard deviations to components, can allocate coefficients of variation (from which the standard deviations can be computed). In other words, the invention can include multiple algorithms, wherein a first algorithm can be used to assign coefficients of variation to the input variables (the ratio of standard deviation to the mean value) and/or a second algorithm can be used to assign standard deviations to the input variables.

A difference between the two algorithms is that when the first algorithm is used, the standard deviation assigned to a variable will also depend on the variable's mean value. This is particularly useful in mechanical tolerancing applications. Values of the coefficient of variation (first algorithm) or standard deviation (second algorithm) can be assigned by requiring the assignment to be inversely proportional to the variable's generalized sensitivity coefficient (raised to an assignable power m).

The allocation process described herein may be applied prior to the construction of any hardware, including prototypes. Thus, there is a potential for enormous savings associated with an initially correct allocation of variability. However, the method also may be applied to the post production analysis and redesign of projects that did not perform well in initial production runs.

According to one aspect of the invention, there is provided a system for implementing a top-down flow down of at least one system requirement to allocate variability to system components such that overall system response meets the at least one system requirement. The system includes a processor circuit having a processor and a memory, and an allocation system stored in the memory and executable by the processor. The allocation system includes logic that accepts a target value for the system response, and logic that uses a non-linear model of the system to relate response variable values to targeted variable values and targeted mean values of the response variable values.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Additionally, in the drawings, like reference numerals designate corresponding parts throughout the several views.

FIG. 1 is a block diagram of a conventional "bottom up" approach to system allocation.

FIG. 6 is a screen snapshot of an exemplary spreadsheet implementation of the allocation system in accordance with the invention.

DESCRIPTION OF THE INVENTION

Figure 2:
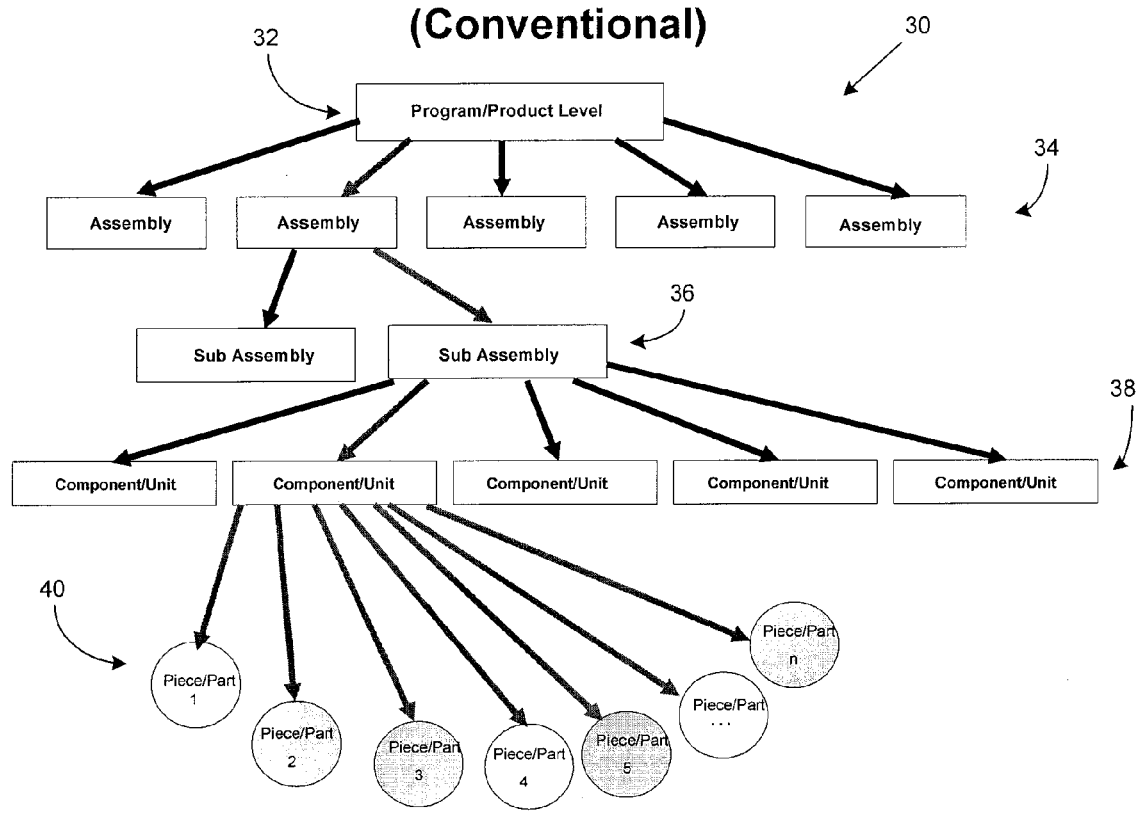
FIG. 2 is a block diagram of an exemplary top down approach to system allocation that can be used in conjunction with the invention.

The following is a detailed description of the present invention with reference to the attached drawings, wherein like reference numerals will refer to like elements throughout.

Since the invention has been developed using a spread sheet program (e.g., Microsoft Excel or the like), it will be chiefly described in this context. It will be appreciated, however, that the invention may be implemented in any number of different programming languages and/or platforms.

Program or Product Level (System) performance can be stated as a requirement to meet a designated SIGMA score, a designated probability of non-compliance (PNC) or a designated standard deviation for the system response. An allocation process in accordance with the present invention can be used to determine the SIGMA score, probability of non-compliance, or standard deviation of each component at a next lower level such that if these requirements are met, then the requirement at the next higher level will be met and will meet the SIGMA score requirement, probability of non-compliance requirement or standard deviation requirement at that higher level.

The determination of SIGMA score, probability of non-compliance, or standard deviation, can be done prior to any prototyping or manufacturing activities. Further, the determination can be based on a quantitative analysis of the propagation of errors through the particular system under consideration. The error propagation can be studied through the use of existing computer simulation codes, through implementation of Designed Experiments (DOE), or through multi-variate regression analysis of existing data. The allocation process can utilize inputs from either of these sources.

FIG. 2 illustrates a process 30 for an exemplary design/manufacturing flow in which product requirements for a system 32 are stated at the highest level. For example, the product requirements may include system performance criteria (e.g., response variable criteria), cost criteria, size, or any other means for defining a goal or target of the system. In practice, the process 30 can be applied between any higher level requirement and all the sublevel components 34, 36, 38, 40 of that requirement that are to be fulfilled in order to satisfy that higher level requirement.

Once the product requirements of the system 32 are stated, components 34, 36, 38, 40 of the process 30 then are identified at the lower levels of the flow diagram (e.g., the assembly level 34, subassembly level 36, component level 38 and parts level 40). Implicit in FIG. 2 is the understanding that each component of a next lower level in the diagram represents a task, set of tasks or specifications that are accomplished or met in order to meet the requirements at the next higher level. As illustrated in FIG. 2, this flow-down of requirements continues downward through the diagram until the lowest level requirements (e.g., requirements for the parts level 40) are finally identified.

Figure 3:
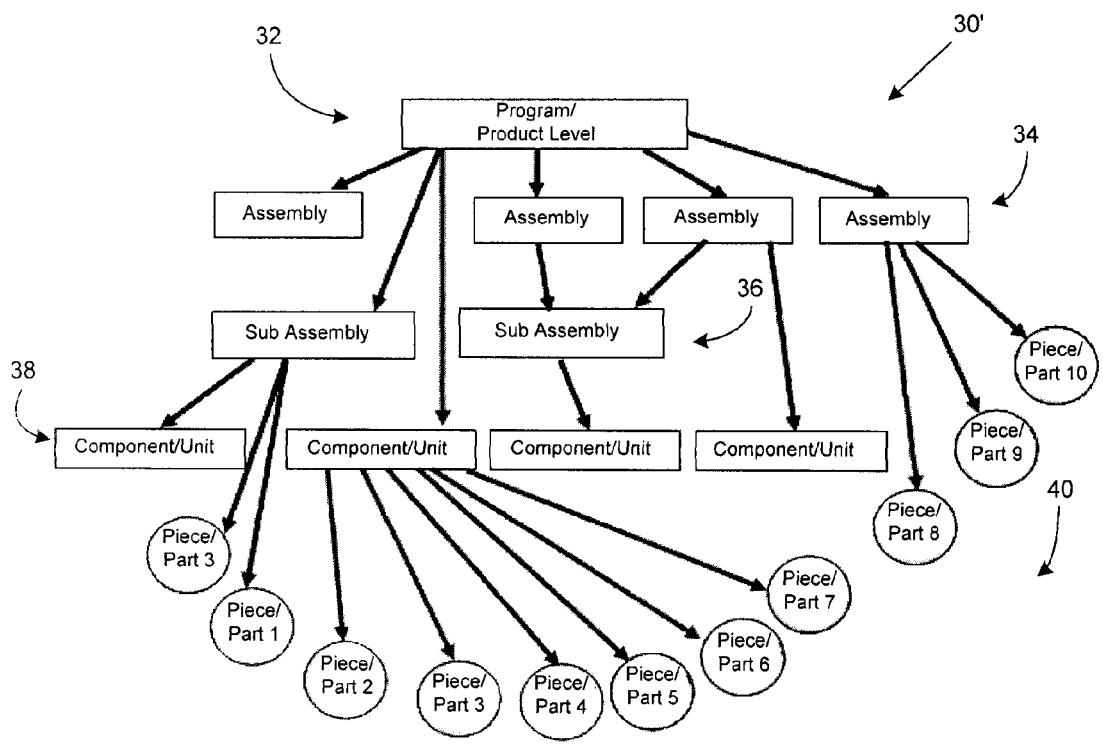
FIG. 3 is a block diagram of another exemplary top down approach to system allocation that can be used in conjunction with the invention.

FIG. 3 illustrates a process 30' for an exemplary design/manufacturing flow in which product requirements directly flow from any higher level requirement to any lower level that it imposes. This is known as a Vertical Requirements Development (VRD) and can avoid startup delays that are sometimes the byproduct of the tiered structure illustrated in FIG. 2. In this process flow, higher level tasks or requirements are directly connected to all pertinent lower level tasks or requirements. Implicit in FIG. 3 is the understanding that there is a functional relation between all the subtasks and the task from which they are derived. As illustrated in FIG. 2, it is considered that this flow-down of requirements continues directly from the highest level of assembly to each task that it imposes, and then from each of these to each task it imposes until no further flow down is possible.

Heuristic and optimal derivations of the allocations can be based on a linear expansion of a system response in the neighborhood of a set of selected design points. The allocation process can further extend the optimal derivation of the basic allocation algorithm by including second order terms in an expansion of the response variable in the neighborhood of the selected design points. Further, the allocation process can add the option of allocating component coefficients of variation rather than component standard deviations, and can do so while preserving all the optimal features of the methodology.

The allocation process in accordance with the invention is unique, for example, in that prior art approaches to allocation are "bottom up" methods: through trial and error (usually by computer), the impact that assumed allocations would have at higher levels are assessed, and the allocations are adjusted until the desired responses are obtained. Since it is not only possible but all too common to initially state requirements that cannot be met through any set of allocations, this bottom up approach will not always converge. Beyond that, since, in principle, there are usually an infinite number of mathematically possible allocations, the fact that one of them may be found in the manner described does not also suggest its properties. There is no way to know, except through additional trial and error, whether the allocations of a bottom up trial and error method are mutually compatible or are otherwise actually desirable. In contrast, allocation process of the present invention, which starts from the highest level requirement, can test immediately whether there is any set of allocations that can meet the requirement, and can propose alternate (best) requirements when the answer is no. Beyond that, every allocation done using this process is known to have certain optimal properties, and the user can target specific optimal features either for the entire flow down process, or separately for each component part of the flow down.

Thus, the process in accordance with the invention represents a top down approach which allocates variability (standard deviations) to components based on targeted requirements for a response. Implementation of the allocation process includes:
  an equation or simulation that relates response variable values to the values of the design variables, as well as mean values for each design variable; and
  the upper and lower specification limits of a response variable are given and a target value is specified for the response standard deviation (or the probability of non-compliance (PNC), or SIGMA score).

Given these, the allocation process in accordance with the invention can be used to assign a standard deviation to each design variable such that all design requirements will be met. This can be applied to any type of response variable (performance, schedule, cost, etc.) and can be done prior to any hardware prototyping or manufacturing activity.

Figure 4:
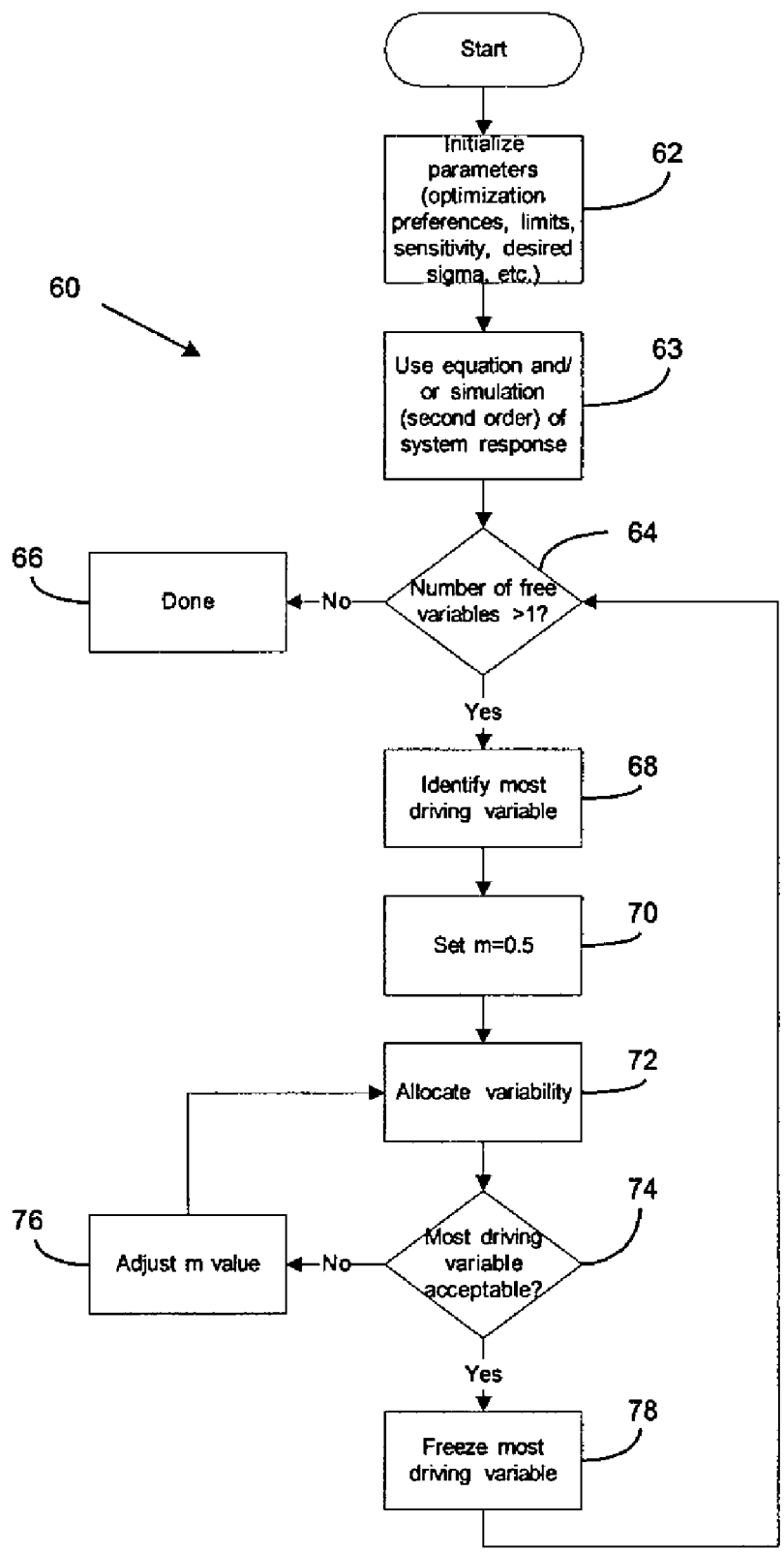
FIG. 4 is a flow chart illustrating an exemplary method of allocation in accordance with the invention.

FIG. 4 is a flow chart 60 that illustrates the conceptual steps in the application of the allocation process. For example, if working with an equation that relates the values of a key response variable to the values of the input variables, the equation is entered on a process worksheet as well as the variable names and their mean values. Application of the allocation process includes computation of the first and second derivatives of the response with respect to each input variable. The allocation process can include an internal feature that fits the response to a sixth order polynomial model of the response variable. This model can be used to estimate the first and second derivatives of the response. Alternatively, if working with data extracted from an external simulation, the first and second derivatives of the response with respect to each input variable can be input to the system. Once the derivatives have been obtained, the process illustrated in FIG. 4 is applicable.

Beginning at step 62 of FIG. 4, parameters are initialized. These parameters include, for example, operational limits, sensitivity of the allocation process and/or the system, the desired sigma. At step 63, one or more equations (or simulations) that relate response variable values to the values of the design variables, as well as mean values for each design variable are used to determine system response. Preferably, the equation is at least a second order equation or a non-linear model of the system under study.

Next, at step 64 the number of free variables is checked to determine if the process is complete. A free variable is defined as an input variable that has not yet been assigned a standard deviation. If the number of free variables is one or less, then the process is complete as indicated at step 66. However, if the number of free variables is greater than one, then at step 68 the most driving variable is identified, and at step 70 the "m-value" is set to 0.5.

The most driving variable is defined as an input that has the greatest influence on variability of the response. The influence of each variable or component on system response variability is an output of the allocation methodology and can be seen in column "L" of the Excel based implementation of the process (this is shown as column L in FIG. 6). A user of the methodology, however, may exercise the option of focusing first on some variable or component other than the one which contributes most to system variability. This would be appropriate if the variable or component in question were relatively easy to control but another variable or component was hard to control and perhaps more expensive and/or more difficult to purchase (availability) or manufacture).

At step 72, allocation of variability is performed for the free variables. The actual allocation process includes choosing an m-value (step 70) and selecting the option to "Allocate". Each time this is done each free variable is assigned a standard deviation. This set of component standard deviations can be presented to the user for review, and the process is repeated until each free variable has been assigned a standard deviation. It is noted that it is possible to generate an infinite loop during the allocation step. Should an infinite loop be generated, then there is not enough variability left in the system. To remedy the situation, the desired a can be increased, or the variation of a previously frozen parameter can be tightened and the process reinitialized.

At step 74, it is determined if the most driving variable is acceptable. In other words, does the most driving variable satisfy and/or enable the specified criteria to be satisfied. If it is not acceptable, then at step 76 the m-value is adjusted, and the method moves back to step 72. Further detail with respect to the m-value will be described below with respect to FIG. 5.

If the most driving variable is acceptable, then at step 78 that variable is frozen, and the method moves back to step 64 and the subsequent steps are repeated. Each iteration through the outer loop reduces the number of allocatable variables by one. Eventually, there will be exactly one variable left, and at that point the design is fully constrained.

It is noted that there must be more than one input variable that has not yet been assigned a standard deviation in order for there to be anything for the tool to do. If there were only one such variable the tool would simply assign to that single variable the only value that will meet the response variable requirements (which is stated as a PNC, standard deviation, or SIGMA score). Assuming there is more than one variable still requiring an assignment of its standard deviation, an 'm-value' is selected and the allocation is performed (e.g., by selecting a soft button on a computer screen). Values for the standard deviation of each unallocated variable then are computed and displayed via a user interface, for example. What is assured is that the product will function within its designated specification limits if each component of the product has the assigned standard deviations. This is in contrast to all other existing methods of allocation which, as stated earlier, are bottom up approaches—fundamentally implemented as smart trial and error algorithms. In the allocation process described herein, the user is always presented with a correct mathematical solution of the allocation problem. Nevertheless, one or more of the allocated standard deviations may be unacceptable to the user for any one of several reason. For example, the assigned standard deviation may be so small that the cost associated with manufacturing components to meet the criteria would be costly (or not even producible), or the user may have previous experience or engineering judgment that suggests a larger (usually cheaper) or even smaller value is possible.

Figure 5:
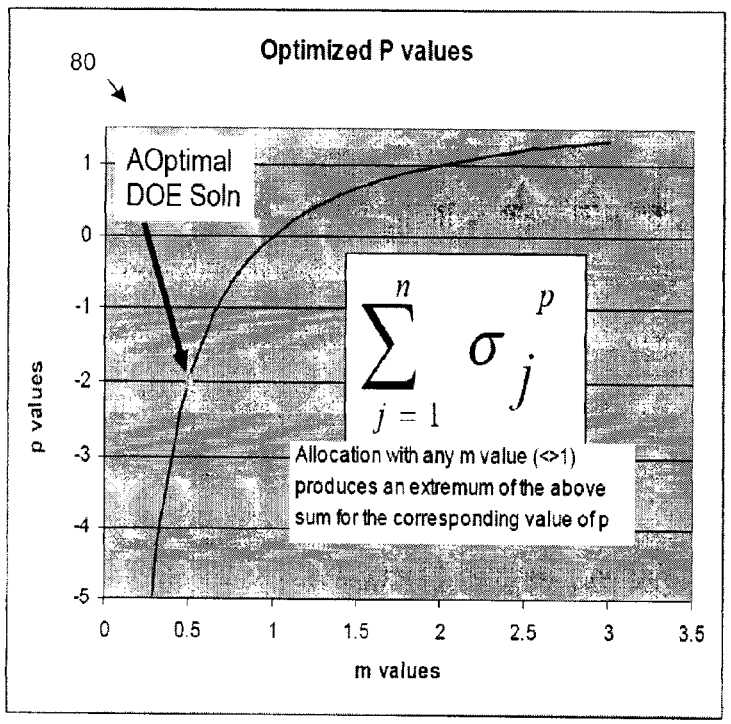
FIG. 5 is an exemplary graph illustrating the relationship between m and p values in accordance with the invention.

In the process of computing the candidate standard deviations, the allocation process also may compute the fractional computation of each input variable to the overall variability of the response. Thus, the user can prioritize the order in which the input variables are treated by first treating those that have the greatest influence on the variability of the response. If some of the candidate standard deviations are acceptable, but not others, the user has the option to lock in those acceptable values and to then restart the problem with that many fewer variables. At each stage of the allocation the user has the option of changing the 'm-value' that is used as the key for generating the allocations. Any choice of the 'm-value' will result in some optimal property for the collection of assigned standard deviations. Some particular values of m that produce easily understood results are shown in FIG. 5.

Suppose for example that the user selects the value m=0.5 with which to do the allocation (e.g., this may be the default value of the process). As indicated by the graph 80 in FIG. 5, this corresponds to what is known as an 'AOptimal' solution in the Design of Experiments and produces a values such that the quantity of Equation 1 is minimized.

$$\sum_{j=1}^{n} \frac{1}{\sigma_j^2} \qquad \text{Equation 1}$$

This means that no other assignment of standard deviation values to the free parameters of this design can meet the design requirements and produce a smaller value for the indicated summation. Since this sum can only be minimal if the standard deviations are near their largest possible values, the implication is that this particular allocation has the property of meeting the requirements while using a maximum portion of the allowable design space. Any other value of m (other than 1) produces a similar result which can be read from FIG. 5. For the special case that m=1, the process produces a set of component standard deviations that maximizes the product of all the component standard deviations.

Other special cases of interest include the following.
Equation 2 is maximized when m=2.

$$\sum_{i=1}^{n} \sigma_i \qquad \text{Equation 2}$$

DOptimal designs (m=1)—Each variable is allocated an equal part of the total response variable variance. The product of all component standard deviations is maximized.

Equation 3 is minimized when m=⅔.

$$\sum_{i=1}^{n} \frac{1}{\sigma_i} \qquad \text{Equation 3}$$

AOptimal design—Equation 4 is minimized when m=½

$$\sum_{i=1}^{n} \frac{1}{\sigma_i^2} \qquad \text{Equation 4}$$

Equal standard deviations—Each variable is allocated the same value for its standard deviation when m=0.

Thus, no matter what m-value is actually used, the allocation assigns standard deviations to design components that in some sense (as defined above and in FIG. 5) maximizes the volume used in design space, and in particular, pushes component standard deviations to their largest possible limits.

Since large component standard deviations are usually easier and cheaper to produce than small component standard deviations, this establishes a link between the allocation process and system cost. An exemplary rule of thumb that will lead to designs that are near minimum cost is at each step of the allocation process, the least value of m is chosen that produces an achievable value for the most driving value.

FIG. 6 shows an image of an exemplary Excel instantiation of the allocation process 82. Note that pre-assigned tolerances (cells D9 and D10) are entered for the variables "Temperature" and "Pressure". These are atmospheric 'noise' variables and cannot be controlled so historical weather data is used to assign tolerances to them. In this case these are three sigma tolerances (see column I—Tolerances in σ) but tolerances for other sigma values also can be used. The column labeled 'Calc Sens' (column C) holds the first derivative values, and the column labeled 'Factor $2^{nd}$ Derivatives' (column M) holds the second derivative values. In this case, an equation has been entered into cell B36 so the tool has computed and entered the derivative values by using its internal differentiation routine. If the tool were being used to allocate to a problem that was resident in an external simulation, the first and second derivative values would be pre-computed and manually entered in columns C and M. Also, in the equation entry (B36), one can manually enter the value of the output response when all the input variables are at their mean values. Except for this difference in user inputs, the process will otherwise be the same for these two cases.

Figure 7:
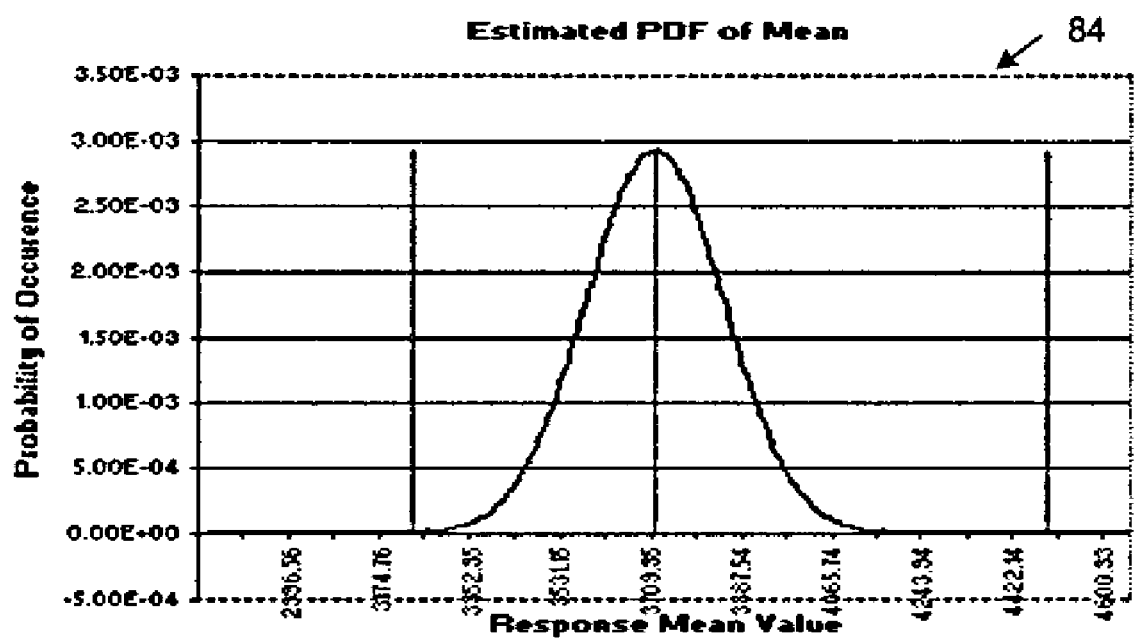
FIG. 7 is a graph illustrating an exemplary graphical output of the estimated PDF mean in accordance with the invention.

When the "Toggle Graphic Button" on the main screen is clicked or otherwise activated, a display is shown. FIG. 7 illustrates an exemplary display 84 having a normal probability density curve representing the response along with the response specification limits. The actual value of response PNC can be read from the main screen.

Methodology

Let us define, for each input variable of a composite system two variables, which we will refer to as the generalized sensitivity, FS, and generalized variance, $\zeta^2$, associated with that variable and a particular response. By properly defining the variables FS and $\zeta^2$ for each variable, we will show that to second order the system response variance can always be expressed as Equation 5, where the sum is over all the input variables in the system and the subscript R refers to the response or output variable.

$$\sigma_R^2 = \sum_i \{FS_i^2 \zeta_i^2\} \quad \text{Equation 5}$$

$$\Phi_1 = \sum_i \zeta_i^p \quad \text{Equation 6}$$

$$\Phi_2 = \prod_i \zeta_i \quad \text{Equation 7}$$

The allocation problem is, given the values of the generalized sensitivities, to assign values to generalized variances such that the targeted variance, $\sigma_R^2$, is met. If we now define a function $\phi_1$ by Equation 6 and a function $\phi_2$ by equation 7, and seek to find extreme values of $\phi_1$ and $\phi_2$ subject to the constraint that Equation 5 is satisfied, we find the solutions shown in Equation 8, which produces the extrema of $\phi_1$, and Equation 9 which produces the extrema of $\phi_2$.

$$\zeta_i = \frac{\sigma_R}{\sqrt{\sum_j FS_j^{\frac{2p}{p-2}}}} FS_i^{\frac{2}{p-2}} \quad \text{Equation 8}$$

$$\zeta_i = \frac{\sigma_R}{\sqrt{n}} FS_i^{-1} \quad \text{Equation 9}$$

It is also noted that the solution represented by Equations 9 is reproduced by the solutions represented by Equation 8 in the special case that p=0. Henceforth we will take Equation 8 as the general solution and just recall that it is the product represented by Equation 6 that takes an extreme value in the special case that p=0.

If a first order Taylor series representation of the response is built and the variance of the response from this model is computed, it will be seen that the above analysis leads to a unique assignment of variabilities of the input variables {x} with the associations shown in Equations 10 (where y represents the modeled system response) and 11. This explains the notation since FS represents the factor sensitivity and $\zeta^2$ the factor variance.

$$FS_i = \frac{\partial y}{\partial x} \quad \text{Equation 10}$$

$$\zeta_i = \sigma_i \quad \text{Equation 11}$$

In the original heuristic 'derivation' of the allocation algorithm the standard deviations were assigned to components such that they were inversely proportional to their sensitivities raised to some power m. Thus, variables whose changes had the largest impact on the response would be more tightly controlled and vice versa. This leads directly to an equation of the form of Equation 8 and only requires the association p=2(m−1)/m to connect to the optimal derivation of the allocation algorithm. Briefly referring back to FIG. 5, allocation with any m-value (m< >1) produces extremum of the summation in FIG. 5 for the corresponding value of p. Additionally, the previously discussed special cases of interest with respect to m-values are applicable.

If instead of relying on the linear model of the response, a second order Taylor series model of the response is built in the neighborhood of a design point and its variance computed, then Equation 12 is obtained, where, for each variable, $S_i$ and $T_i$ represent the first and second derivatives of the response and $SK_i$ and $K_i$ represent the Skewness and Kurtosis of variable #i.

$$\sigma_R^2 = \sum_i \left\{ S_i^2 \sigma_i^2 + S_i T_i \sigma_i^3 SK_i + \left[\frac{T_i \sigma_i^2}{2}\right]^2 (K_i - 1) \right\} \quad \text{Equation 12}$$

Equation 12 is complete to second order except that it neglects the covariance terms between the variables {x}. However, it is known that through a suitable (e.g., orthogonal) choice of coordinates, the covariance terms can be made to vanish so there is no real loss of generality in the use of Equation 12. In the context of design, in most instances it is reasonable that the skewness of each variable would be zero. That is, in most cases the intent, having somehow assigned variances to the variables, would be to have them produced so that they were symmetric about their means. It is also likely in this context that the Kurtosis values would be close to 3, assuming the errors were random. However, in the following Equation 12 is dealt with in the form presented and the question of the values for the skewness and kurtosis are left open.

The allocation problem posed by Equation 12 appears to be significantly more difficult than the one already solved, yet it is noted that in three separate cases, equation 12 can be cast in the form of Equation 5.

Case 1 (Equations 13 and 14) is represented by variables with respect to which the model is linear.

$$FS_i = \frac{\partial y}{\partial x_i} \quad \text{Equation 13}$$

$$\zeta_i = \sigma_i \quad \text{Equation 14}$$

Case 2 (Equations 15 and 16) is represented by the case in which the factor sensitivity coefficients is not zero.

$$FS_i = S_i \quad \text{Equation 15}$$

$$\zeta_i^2 = \sigma_i^2 + \left(\frac{T_i}{S_i}\right)\sigma_i^3 SK_i + \left(\frac{T_i \sigma_i^2}{2S_i}\right)(K_i - 1) \quad \text{Equation 16}$$

Case 3 (Equations 17 and 18) covers the situation in which a factor sensitivity coefficient may be zero.

$$FS_i = T_i \quad \text{Equation 17}$$

-continued $$\zeta_i^2 = \left(\frac{\sigma_i^2}{2}\right)^2 (K_i - 1) \qquad \text{Equation 18}$$

The general solution for $\zeta_i$ is provided by Equation 8 in either of these cases. In case 1, we simply associate $\zeta_i$ with $\sigma_i$. In case 2, if the factor skewness is not zero, then Equation 12 is solved numerically for the $\sigma_i$ but if the factor skewness is zero, Equation 12 becomes a quadratic in $\sigma_i^2$ and the factor standard deviations can be solved directly. This also holds for case 3, which is a quadratic in $\sigma_i^2$.

Finally, it is noted that extrema of the generalized variances as defined herein also correspond to extrema of the design factor standard deviations in all cases except some of those for which the skewness is not zero. If the skewness is not zero and the product of the three quantities First Derivative, Second Derivative, and Skewness is less than zero (any two or all three being less than zero), then the solution produced by the above methods may not correspond to an 'optimum' solution as defined herein, but it will provide a solution to the allocation problem as originally stated and will be an optimum solution in the limit as the skewness goes to zero, or the above named product becomes positive.

The allocation tool can be built on the above principles and can implement all the cases identified above. This process is unique in its ability to produce an optimized and analytic allocation/flowdown of variabilities to system components based on requirements given at the system level.

In a variant of the above methodology the quantity to be optimized is changed from equation 6 to equation 19, where the quantity $\zeta_i/\mu_i$ can be interpreted as a generalized coefficient of variation.

$$\Phi_1 = \sum_i \left(\frac{\zeta_i}{\mu_i}\right)^p \qquad \text{Equation 19}$$

$$\zeta_i = \frac{\sigma_R}{\sqrt{\sum_j (\mu_j FS_j)^{\frac{2p}{p-2}}}} \mu_i^{\frac{p}{p-2}} FS_i^{\frac{2}{p-2}} \qquad \text{Equation 20}$$

The development proceeds exactly the same as the previous developments but leads to the assignments for the generalized variances as shown in Equation 20.

In this development all the optimal properties previously associated with the square root of the generalized variance now apply to the generalized coefficient of variation. In many cases, weighting the allocated variances in this way is more useful than the original version of the algorithm, and may be the default algorithm in the implementation of the allocation process.

Using the coefficient of variation or the generalized coefficient of variation in this way is useful when doing mechanical tolerancing applications since they typically are dimensional stack-ups. In such cases all the first derivative values of the response would be equal, and all the second derivative values would be zero, and the tool would be unable to differentiate between the different components of the design even though they might be orders of magnitude different in their dimensions. The default version of the algorithm reflects the contribution of the component mean values in the generalized variance and will generate different optimal allocations as the m-value is changed.

Figure 8:
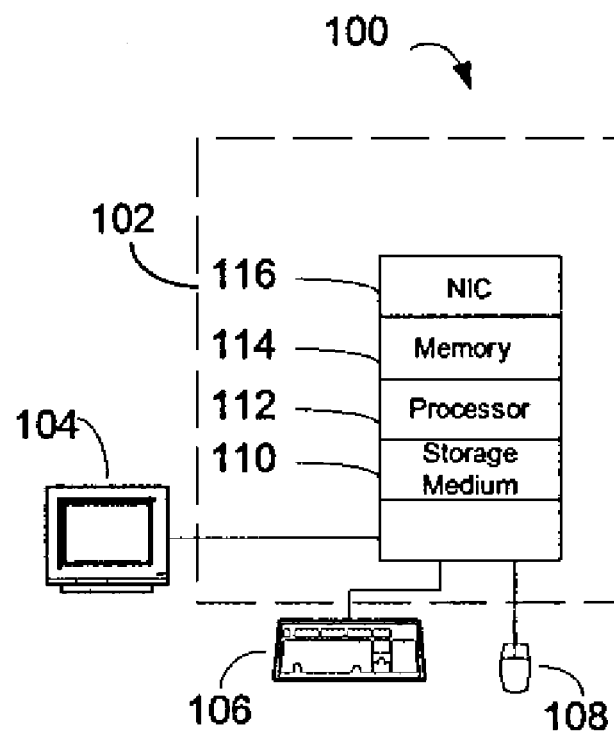
FIG. 8 is a block diagram illustrating an exemplary computer system that can be used to implement the method in accordance with the invention.

The above methodology may be implemented in a computer system that executes coder for example. FIG. 8 illustrates an exemplary computer system 100 for executing a computer program in accordance with the present invention. The computer system 100 includes a computer 102 for processing data, and a display 104, such as a CRT, LCD, or the like, for viewing system information. A keyboard 106 and pointing device 108 may be used for data entry, data display, screen navigation, etc. The keyboard 106 and pointing device 108 may be separate from the computer 102 or they may be integral to it. A computer mouse or other device that points to or otherwise identifies a location, action, etc., e.g., by a point and click method or some other method, are examples of a pointing device. Alternatively, a touch screen (not shown) may be used in place of the keyboard 106 and pointing device 108.

Included in the computer 102 is a storage medium 110 for storing information, such as application data, screen information, programs, etc. The storage medium 110 may be a hard drive, for example. A processor 112, such as an AMD Athlon 64™ processor or an Intel Pentium IV® processor, combined with a memory 114 and the storage medium 110 execute programs to perform various functions, such as data entry, numerical calculations, screen display, system setup, etc. A network interface card (NIC) 116 allows the computer 102 to communicate with devices external to the computer system 100.

A user of the system may enter data into the computer 102 via the keyboard 106 and/or pointing device 108, and the computer 102 may provide results via the display 104. For example, and briefly referring back to FIG. 4, at step 62 a user may enter operational limits, system sensitivity, desired sigma, one or more equations defining the system, execution preferences, etc. via keyboard 106 and/or pointing device 108. Then, the computer 102, via code stored in memory 114 and executed by the processor 112, executes steps 64 through 74. If at step 74 the most driving variable is determined to be unacceptable, then the computer 102, via the display 104, may prompt the user to enter a new m-value (or the computer may automatically change the m-value). The user then enters the new m-value via the keyboard 106 and then steps 72 and 74 are repeated. If at step 74 the most driving variable is determined to be acceptable, then the computer 102 can execute step 78 and return to step 64. Once the process is complete, the computer 102 can provide results to the user via the display 104, for example.

The actual code for performing the functions described herein can be easily programmed by a person having ordinary skill in the art of computer programming in any of a number of conventional programming languages based on the disclosure herein. Consequently, further detail as to the particular code itself has been omitted for sake of brevity.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A device for implementing a top-down flow down of at least one system requirement to allocate variability to a plurality of system components, comprising:
    a processor circuit having a processor and a memory, said processor circuit configured to
        receive data corresponding to a non-linear model of the at least one system;
        receive data corresponding to each of the plurality of system components;
        receive a user selectable real number (m-value);
        receive the at least one system requirement;
        use the non-linear model data, the data corresponding to each of the plurality of system components, and the m-value to allocate variance to each of the plurality of system components such that overall system response satisfies the at least one system requirement, wherein the variance of the non-linear model is expressed by at least one of $$\sigma_R^2 = \sum_i \{FS_i^2 \zeta_i^2\},$$

$$\zeta_i = \frac{\sigma_R}{\sqrt{\sum_j FS_j^{\frac{2p}{p-2}}}} FS_i^{\frac{2}{p-2}},$$

$$\zeta_i = \frac{\sigma_R}{\sqrt{\sum_j (\mu_j FS_j)^{\frac{2p}{p-2}}}} \mu_i^{\frac{p}{p-2}} FS_i^{\frac{2}{p-2}}, \text{ or}$$

-continued $$\sigma_R^2 = \sum_i \left\{ S_i^2 \sigma_i^2 + S_i T_i \sigma_i^3 SK_i + \left[ \frac{T_i \sigma_i^2}{2} \right]^2 (K_i - 1) \right\},$$

where $\sigma_R$ is the targeted variance of the response variable R, $FS_i$ is the generalized sensitivity coefficient, $\zeta_i$ is the generalized variance coefficient, $\mu_i$ is the mean value of, p is a real number based on the m-value $S_i$ and $T_i$ are first and second derivatives of the response, $SK_i$ is the Skewness and $T_i$ is the Kurtosis; and
output the variance for each of the plurality of system components.

2. The system of claim 1, wherein the processor circuit is further configured to:
    identify a most driving variable; and
    use the model to allocate variance to the most driving variable.

3. The system of claim 2, wherein the processor circuit is further configured to freeze the variance of the most driving variable if the allocation is acceptable, or adjust a power of the model and re-allocate the variance of the most driving variable if the allocation is not acceptable.

4. The system of claim 3, wherein the processor circuit is further configured to adjust the variance to obtain an AOptimal solution or a DOptimal solution.

5. The system of claim 2, wherein the processor circuit is further configured to allocate component coefficients of variation.

6. The system of claim 1, wherein the processor circuit is further configured to allocate component standard deviations.

7. The system of claim 1, wherein the processor circuit is further configured to receive at least one of upper and lower limits of a standard deviation, probability of non-compliance, or SIGMA score of the response, and use at least one of the upper and lower limits of the standard deviation, probability of non-compliance, or SIGMA score in allocating variance.

8. The system of claim 1, wherein the processor circuit is further configured to optimize the allocation such that at least one function of component standard deviation takes on an extreme value.

9. The system of claim 1, wherein the system requirements include at least one of performance criteria, cost criteria or size criteria.

10. The system of claim 1, wherein the non-linear model is a second order model of system response.

11. The system of claim 1, wherein the at least one system requirement is defined as at least one of a system response, a standard deviation, a probability of non-compliance, or a SIGMA score.

12. The system of claim 1, wherein the processor circuit is further configured to receive an optimization preference, and use the optimization preference to make maximal use of multidimensional design space.

13. A computer implemented method for creating a top-down flow down of at least one system requirement to allocate variability to a plurality of system components, comprising:
    receiving data corresponding to a non-linear model of the at least one system;
    receiving data corresponding to each of the plurality of system components;
    receiving a user selectable real number (m-value);
    receiving the at least one system requirement;
    using the non-linear model data, the data corresponding to each of the plurality of system components, and the m-value to allocate, with computer assistance, variance to each of the plurality of system components such that overall system response satisfies the at least one system requirement, wherein the variance of the non-linear model is expressed by at least one of $$\sigma_R^2 = \sum_i \{FS_i^2 \zeta_i^2\},$$

$$\zeta_i = \frac{\sigma_R}{\sqrt{\sum_j FS_j^{\frac{2p}{p-2}}}} FS_i^{\frac{2}{p-2}},$$

$$\zeta_i = \frac{\sigma_R}{\sqrt{\sum_j (\mu_j FS_j)^{\frac{2p}{p-2}}}} \mu_i^{\frac{p}{p-2}} FS_i^{\frac{2}{p-2}}, \text{ or}$$

$$\sigma_R^2 = \sum_i \left\{ S_i^2 \sigma_i^2 + S_i T_i \sigma_i^3 SK_i + \left[\frac{T_i \sigma_i^2}{2}\right]^2 (K_i - 1) \right\},$$

where $\sigma_R$ is the targeted variance of the response variable R, $FS_i$ is the generalized sensitivity coefficient, $\zeta_i$ is the generalized variance coefficient, $\mu_i$ is the mean value of, p is a real number based on the m-value, $S_i$ and $T_i$ are first and second derivatives of the response, $SK_i$ is the Skewness and $T_i$ is the Kurtosis; and outputting the variance for each of the plurality of system components.

14. The method of claim 13, further comprising:
identifying a most driving variable; and
using the model to allocate variance to the most driving variable.

15. The method of claim 14, further comprising at least one of freezing the variance of the of the most driving variable once the allocation is acceptable, re-allocating the variance of any or all variables with different optimal objectives, or re-allocating so that a more easily controlled variable becomes the most driving variable.

16. The method of claim 15, wherein adjusting the variance includes adjusting to obtain an AOptimal solution or a DOptimal solution.

17. The method of claim 14, wherein using the model to allocate variance includes allocating component coefficients of variation.

18. The method of claim 13, wherein using the model to allocate variance includes allocating component standard deviations.

19. The method of claim 13, further comprising specifying at least one of upper and lower limits of a standard deviation, probability of non-compliance, or SIGMA score of the response, and using at least one of the upper and lower limits of the standard deviation, probability of non-compliance, or SIGMA score in allocating variance.

20. The method of claim 13, wherein using the non-linear model data and the data corresponding to each of the plurality of system components to allocate variance to each of the plurality of system components includes optimizing the allocation such that at least one function of component standard deviation takes on an extreme value.

21. The method of claim 13, wherein the system requirements include at least one of performance criteria, cost criteria or size criteria.

22. The method of claim 13, wherein the non-linear model is a second order model of system response.

23. The method of claim 13, wherein the at least one system requirement is defined as at least one of a system response, a standard deviation, a probability of non-compliance, or a SIGMA score.

24. The method of claim 13, further comprising specifying an optimization preference, wherein the optimization preference is utilized by the model to make maximal use of multi-dimensional design space.

25. The device according to claim 1, wherein the processor circuit is further configured to map the m-value into a measure of design space optimization.

26. The device according to claim 25, wherein the processor circuit is further configured to find, for the m-value, an exact solution for system response variance to second order including terms that include a first four moments of each system component.

27. The device according to claim 1, wherein the processor circuit is further configured to compute first and second derivatives of the system response with respect to each of the plurality of system components in a neighborhood of a system design point.

28. The device according to claim 27, wherein the processor circuit is further configured to use the first and second derivatives of the response to allocate variance to each of the plurality of system components such that overall system response satisfies the at least one system requirement.

29. The device according to claim 1, wherein the data for each of the plurality of system components is data corresponding to a mean value for each of the system components.

* * * * *